US007819740B2

(12) United States Patent
Masci et al.

(10) Patent No.: US 7,819,740 B2
(45) Date of Patent: Oct. 26, 2010

(54) GAMING DEVICE HAVING A PLURALITY OF PAYLINES AND DIFFERENT MODIFIERS ASSOCIATED WITH THE PAYLINES

(75) Inventors: Joseph D. Masci, Montrose, NY (US); Howard M. Marks, Scarsdale, NY (US); Anthony M. Singer, Ringwood, NJ (US); Daniel M. Marks, Washington, DC (US)

(73) Assignee: IGT, Reno, NV (US)

( * ) Notice: Subject to any disclaimer, the term of this patent is extended or adjusted under 35 U.S.C. 154(b) by 1468 days.

(21) Appl. No.: 10/773,378

(22) Filed: Feb. 6, 2004

(65) Prior Publication Data

US 2004/0195773 A1 Oct. 7, 2004

(51) Int. Cl.
*A63F 13/00* (2006.01)

(52) U.S. Cl. ....................................................... 463/20

(58) Field of Classification Search .................... 463/20
See application file for complete search history.

(56) References Cited

U.S. PATENT DOCUMENTS 4,448,419 A 5/1984 Telnaes
4,695,053 A 9/1987 Vazquez, Jr. et al.
4,838,552 A 6/1989 Hagiwara
4,991,848 A 2/1991 Greenwood et al.
RE34,244 E 5/1993 Hagiwara
5,449,173 A 9/1995 Thomas et al.
5,489,101 A 2/1996 Moody
5,531,448 A 7/1996 Moody
5,611,535 A 3/1997 Tiberio
5,725,428 A * 3/1998 Achmuller .................. 463/20
5,732,950 A 3/1998 Moody
5,769,716 A 6/1998 Saffari et al.
5,807,172 A * 9/1998 Piechowiak .................. 463/20
5,816,916 A 10/1998 Moody
5,823,873 A 10/1998 Moody
5,833,537 A * 11/1998 Barrie ......................... 463/21
5,882,261 A 3/1999 Adams
5,890,962 A 4/1999 Takemoto (Continued)

FOREIGN PATENT DOCUMENTS

AU 199716432 B2 9/1997

(Continued)

OTHER PUBLICATIONS

3-Way Action Poker Brochure and Article written by IGT, published in 2002, on or before December thereof.

(Continued)

*Primary Examiner*—Dmitry Suhol
*Assistant Examiner*—Thomas H Henry
(74) *Attorney, Agent, or Firm*—K&L Gates LLP

(57) ABSTRACT

A gaming device including a plurality of reels having a plurality of symbols where a plurality of paylines are associated with the reels. Each of the paylines includes a fixed modifier, such as a fixed multiplier, which multiplies any awards associated with winning symbol combinations on that to enhance the awards provided to the player. In one embodiment, the paylines are numbered and the values of the multipliers are based on the payline numbers. Any winning symbol combinations occurring on the paylines are modified or multiplied by the multiplier associated with those paylines. The enhanced award is then provided to the player in the game.

66 Claims, 9 Drawing Sheets

U.S. PATENT DOCUMENTS

| | | | |
|---|---|---|---|
| 5,954,335 A | 9/1999 | Moody | |
| 5,984,781 A | 11/1999 | Sunaga | |
| 5,984,782 A | 11/1999 | Inoue | |
| 6,004,207 A | 12/1999 | Wilson, Jr. et al. | |
| 6,007,066 A | 12/1999 | Moody | |
| 6,062,980 A | 5/2000 | Luciano | |
| 6,089,928 A | 7/2000 | Miwa et al. | |
| 6,095,921 A * | 8/2000 | Walker et al. | 463/20 |
| 6,098,985 A | 8/2000 | Moody | |
| 6,120,377 A | 9/2000 | McGinnis, Sr. et al. | |
| 6,120,378 A | 9/2000 | Moody et al. | |
| 6,126,542 A | 10/2000 | Fier | |
| 6,155,925 A | 12/2000 | Giobbi et al. | |
| 6,174,233 B1 | 1/2001 | Sunaga et al. | |
| 6,186,894 B1 | 2/2001 | Mayeroff | |
| 6,190,255 B1 * | 2/2001 | Thomas et al. | 463/20 |
| 6,200,217 B1 | 3/2001 | Osawa | |
| 6,224,483 B1 | 5/2001 | Mayeroff | |
| 6,227,971 B1 | 5/2001 | Weiss | |
| 6,231,442 B1 | 5/2001 | Mayeroff | |
| 6,241,607 B1 | 6/2001 | Payne et al. | |
| 6,261,178 B1 | 7/2001 | Bennett | |
| 6,299,165 B1 | 10/2001 | Nagano | |
| 6,309,299 B1 | 10/2001 | Weiss | |
| 6,328,649 B1 | 12/2001 | Randall et al. | |
| 6,334,814 B1 | 1/2002 | Adams | |
| 6,336,860 B1 | 1/2002 | Webb | |
| 6,413,162 B1 | 7/2002 | Baerlocher et al. | |
| 6,471,208 B2 | 10/2002 | Yoseloff et al. | |
| 6,517,432 B1 | 2/2003 | Jaffe | |
| 6,533,279 B2 | 3/2003 | Moody et al. | |
| 6,547,242 B1 | 4/2003 | Sugiyama et al. | |
| 6,558,253 B1 | 5/2003 | DeSimone et al. | |
| 6,604,999 B2 | 8/2003 | Ainsworth | |
| 6,605,002 B2 | 8/2003 | Baerlocher | |
| 6,612,927 B1 | 9/2003 | Slomiany et al. | |
| 6,638,164 B2 | 10/2003 | Randall et al. | |
| 6,695,696 B1 | 2/2004 | Kaminkow | |
| 6,729,621 B2 | 5/2004 | Moody | |
| 6,802,773 B2 | 10/2004 | Moody | |
| 7,258,611 B2 | 8/2007 | Bigelow et al. | |

FOREIGN PATENT DOCUMENTS

| | | |
|---|---|---|
| AU | A-50327/96 | 10/1997 |
| AU | A-63553/98 | 10/1998 |
| DE | 3700861 A1 | 7/1988 |
| DE | 4014477 A1 | 7/1991 |
| EP | 0 688 002 A1 | 12/1995 |
| EP | 0 798 676 A1 | 10/1997 |
| EP | 0 874 337 A1 | 10/1998 |
| EP | 0 926 645 A2 | 6/1999 |
| EP | 0 944 030 A2 | 9/1999 |
| EP | 0 945 837 A2 | 9/1999 |
| EP | 0 984 409 A2 | 3/2000 |
| GB | 2 083 936 A | 3/1982 |
| GB | 2 092 797 B | 8/1982 |
| GB | 2 144 644 A | 3/1985 |
| GB | 2 328 311 A | 2/1999 |
| WO | WO 97/32285 | 9/1997 |
| WO | WO 00/12186 | 3/2000 |

OTHER PUBLICATIONS

Addams Family Advertisement and Article written by IGT, Strictly Slots, published in 2000, on or before December thereof.
American Thunder Screen Shots written by IGT, published in 1998, on or before December thereof.
Black Swan Wagering advertisement and Paytable written by IGT, published prior to 2001.
Bonus Times Article written by Strictly Slots, published in Jul. 2000.
Fifty Play Poker advertisement written by www.actiongaming.com printed Mar. 24, 2005.
Hundred Play Poker advertisement written by www.actiongaming.com printed Mar. 24, 2005.
Leopard Spots™ (website) written by www.igt.com, printed Mar. 21, 2001.
Mega Multiplier® (website) written by www.wmsgaming.com, printed May 22, 2001.
Neon Nights written by IGT, published in 2000, on or before December thereof.
Polly & Roger Brochure written by VLC, Inc, published in 2000, on or before December thereof.
Super Times Pay Poker advertisement written by www.actiongaming.com printed Mar. 24, 2005.
Take Your Pick Advertisement written by IGT/Anchor Gaming, published in 1999, on or before December thereof.
Take Your Pick Article written by Strictly Slots, published in Mar. 2001.
Top Dollar Brochure written by IGT, published in 1998, on or before December thereof.
Totem Pole Advertisement written by IGT, published in 1997.
Triple Play Poker advertisement written by www.actiongaming.com printed Mar. 24, 2005.
Vision Series™/Good Times™ Brochure written by IGT, published in 1999, on or before December thereof.
Wheel Poker Article written by Strictly Slots, published in Nov. 2000.
Winning Streak Web Site Description written by WMS Gaming Inc. (web site), printed on Mar. 21, 2001.
X Factor Brochure written by WMS Gaming, Inc., published in 1998, on or before December thereof.
Yahtzee Bonus Advertisement, written by Mikohn Winning Solutions Worldwide, published 1999, on or before December thereof.
Yahtzee Video Game Advertisement, written by Mikohn Winning Solutions Worldwide, published 1999, on or before December thereof.

* cited by examiner

GAMING DEVICE HAVING A PLURALITY OF PAYLINES AND DIFFERENT MODIFIERS ASSOCIATED WITH THE PAYLINES

PRIORITY CLAIM

This application is a non-provisional patent application of and which claims priority to and the benefit of U.S. Provisional Patent Application Ser. No. 60/445,769, filed Feb. 10, 2003, which is incorporated herein.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

To play a conventional slot machine, a player deposits money in the form of coins, gaming-tokens, paper currency or tickets either into a coin head or bill acceptor, respectively. The coins and gaming tokens are collected in a reservoir inside the gaming machine while the paper currency is collected in the bill acceptor inside the gaming machine. If the coins, gaming tokens or paper currency are validated as authentic, the player accrues the appropriate number of playing credits on a credit meter. For example, a twenty-five cent gaming machine will accrue four credits for each dollar deposited into the gaming machine.

After accruing credits on the credit meter, the player determines how many credits to wager on the next spin of the slot reels. The player causes the gaming device to spin the reels by pressing the spin button or by pulling a handle. When the reels stop spinning, symbols are displayed and the player collects credits for any winning combinations of symbols on the reels and more specifically on the paylines, according to a pay table.

More specifically, slot machines include a symbol matrix which includes symbols displayed on three or more of the reels (also called "columns" or "reel columns") that are adjacent to each other. The resulting matrix of symbols typically ranges from three columns by three rows with nine total symbols, to five columns by three rows with fifteen total symbols. Each position in the symbol matrix is referenced by column, from left to right, and row, from the top to bottom ("symbol positions"). For example: symbol position 1/2 is located in column 1 and row 2.

Players collect credits for predetermined winning symbol combinations that appear in specific or designated symbol positions on the reels. The combination of these designated symbol positions are generally referred to as "paylines." Winning symbol combinations typically require that three or more of the same symbols appear adjacent to each other starting from the leftmost position of a pay line (i.e., a "line pay"). In addition, players may also collect credits for winning symbol combinations that appear anywhere on a pay line (i.e., a "line scatter pay") or anywhere on the reels (i.e., a "reel scatter pay").

In many conventional slot machines, credits are awarded to the player for each winning symbol combination based on a predetermined schedule or paytable. For line pays and line scatter pays, the number of credits wagered on the winning pay line multiplies the number of credits indicated by the pay table. For reel scatter pays, the total number of credits wagered multiplies the number of credits indicated by the pay table.

Following any type of win or payout (e.g., line pays, line scatter pays or reel scatter pays), a designated number of credits are added or transferred to the player's credit balance shown on the credit meter. As long as the player has credits on the credit meter, the player may continue to play the game.

There is a continuing need for new gaming devices which provide players with more opportunities to obtain awards in reel or slot games.

SUMMARY OF THE INVENTION

The present invention relates generally to a slot or reel game and payout methods for a slot machine and, more particularly, to a game and payout method that has different modifiers such as multipliers associated with different paylines to enhance the awards in the game.

In one embodiment of the present invention, the gaming device includes a game having a plurality of reels including a plurality of symbols at different symbol positions or locations on the reels. A plurality of different paylines are associated with the reels. A plurality of fixed escalating modifiers such as fixed multipliers are associated with the different paylines. In this embodiment, the paylines are numbered and the fixed modifiers or multipliers are related to the payline number of each of the paylines.

For example, the multiplier associated with payline one is 1×, the multiplier associated with payline two is 2× and the multiplier associated with payline three is 3×. If any winning symbol combinations occur on one or more of these paylines, the, gaming device provides the award (A) indicated by the designated paytable, the modifier or enhancement (P) associated with the winning payline, and the credits (C) wagered on the payline. Thus, the modifier or enhanced award equals A times P times C. For example, if a certain award associated with a winning symbol combination on payline three provides fifty credits, the modifier is 3× and the player wagered three credits on that third payline, the modified or enhanced award for that winning symbol combination on payline three is 50 times 3 times 3 or four-hundred fifty credits.

It should be appreciated that a game may include any suitable number of a plurality of paylines up to N number of paylines where the modifiers or multipliers associated with a plurality of those paylines are different. In one such embodiment, the Nth payline has a modifier of N×. For example, if a slot game includes ten paylines (i.e., N=10) the value of the multiplier on payline ten is 10× in that embodiment. It should also be appreciated that the modifiers or multipliers may be any suitable values and do not need to be linear, sequential or escalating. Additionally, it should be appreciated that the multipliers do not need to be whole numbers and can be fractional numbers which may more readily enable the game designer to develop the paytable for games with many paylines such as 5, 9, 15, and 25 paylines. However, preferably the modifiers or multipliers are fixed such that prior to placing the wager, the player knows what the different modifier is for each of the different paylines. In one preferred embodiment, the modifiers or multipliers are fixed for the gaming device.

Thus, in one slot embodiment, the gaming device includes an input device that enables a player to enter wager amounts for the paylines. In this embodiment, the player wagers on the paylines in sequential order based on the payline numbers. For example, the player's first wager is placed on payline one, the player's second wager is placed on payline two and the player's third wager is placed on payline three. The player may wager on one payline, a plurality of paylines or all of the paylines in a spin. After the player has wagered on one or more of the paylines, the player spins or activates the reels to indicate different symbol combinations on the paylines associated with the reels. Any winning symbol combinations indicated on the paylines wagered on by the player are respectively multiplied by the fixed multipliers associated with those paylines. The multiplied award is then provided to the player for that spin.

The present invention therefore increases a player's excitement and enjoyment of the game because the player can obtain significantly larger awards due to the multipliers associated with the paylines. In addition, the player has the opportunity to receive very large awards depending on where a particular winning symbol combination or winning symbol combinations occur in a game.

In one embodiment as indicated above, the fixed payline modifiers or multipliers correspond to the payline numbers. The values of the payline multipliers are predetermined. The number of paylines associated with the reels is predetermined.

The present invention may be employed in a primary game, a secondary or bonus game, or any other suitable type of game.

It is therefore an advantage of the present invention to provide a gaming device that modifies any awards associated with winning symbol combinations indicated on a payline using a fixed modifier associated with each of the paylines.

Another advantage of the present invention is to provide a plurality of escalating multipliers associated with the paylines in a game.

Additional features and advantages of the present invention are described in, and will be apparent from, the following Detailed Description of the Invention and the figures.

DETAILED DESCRIPTION OF THE INVENTION

Figure 1A:
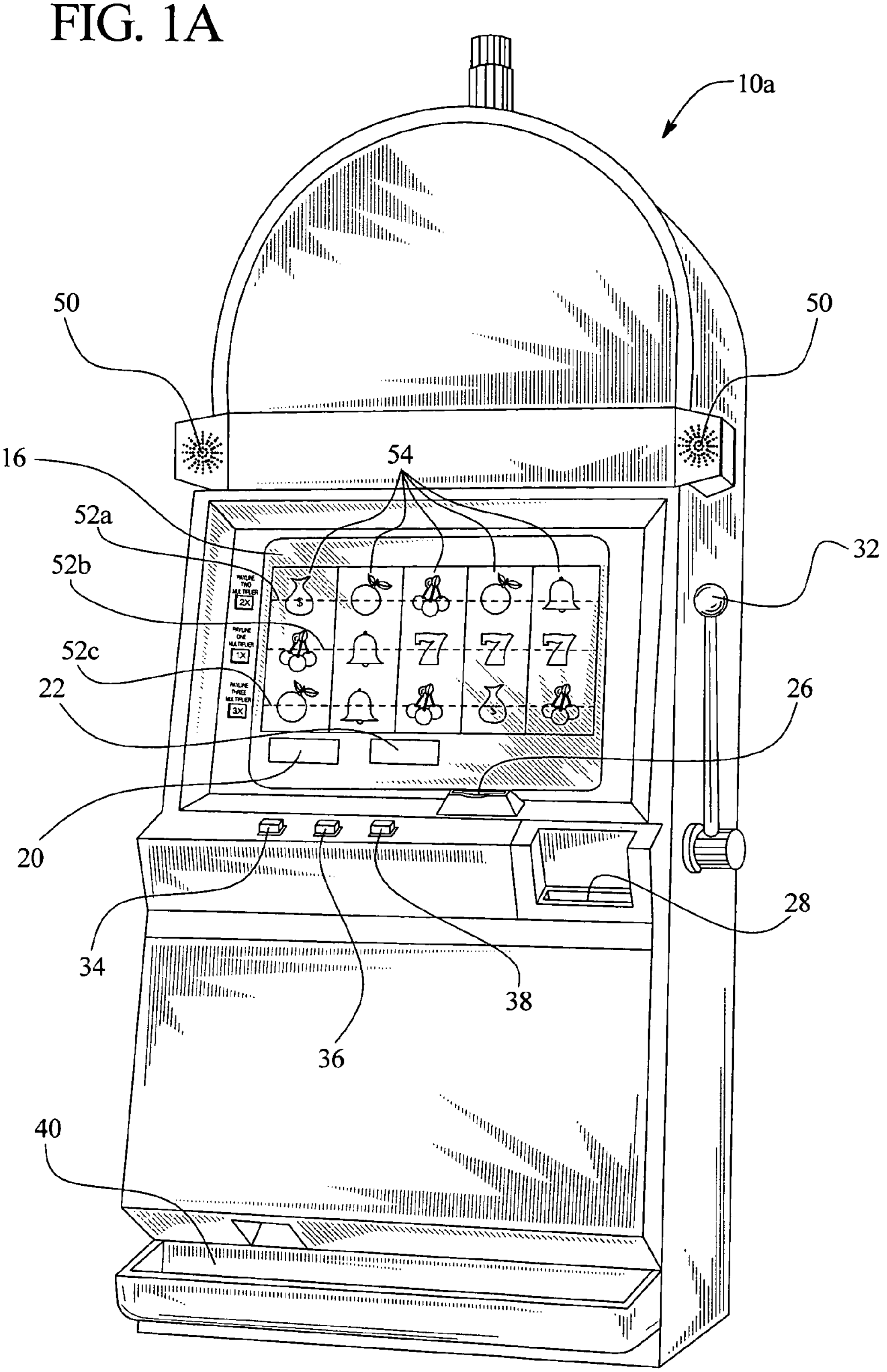
FIG. 1A is a front perspective view of one embodiment of the gaming device of the present invention.
Figure 1B:
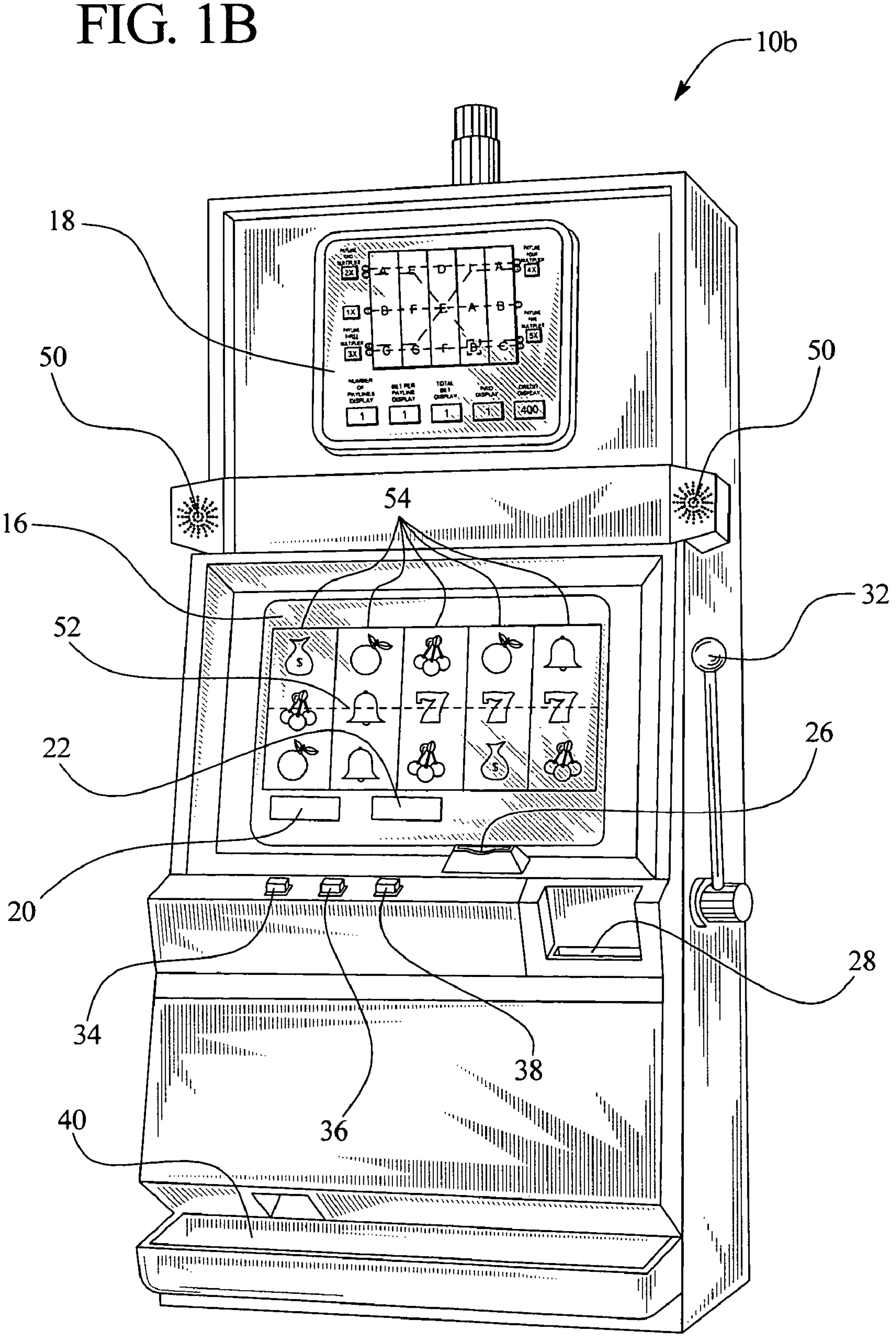
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
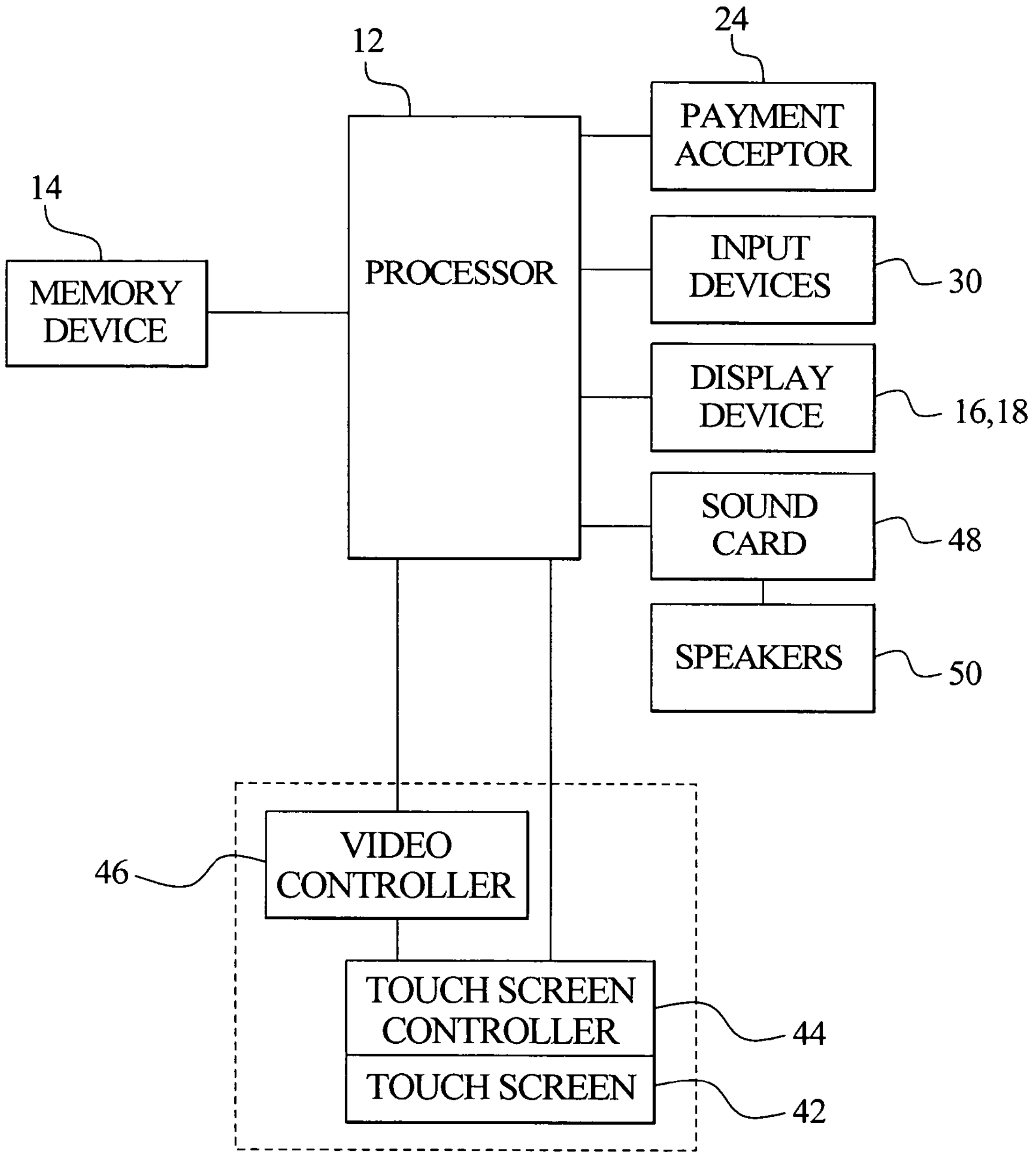
FIG. 2A is a schematic block diagram of the electronic configuration of one embodiment of the gaming device of the present invention.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any secondary game associated with the primary game as well as information relating to the primary or secondary game. The alternative embodiment shown in FIG. 1B includes a central display device 16 and an upper display device 18. The upper display device may display the primary game, any suitable secondary game associated with the primary game and/or information relating to the primary or secondary game. As seen in FIGS. 1A and 1B, in one embodiment, gaming device includes a credit display 20 which displays a player's current number of credits, cash, account balance or the equivalent. In one embodiment, gaming device includes a bet display 22 which displays a player's amount wagered.

The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 24 in communication with the processor. As seen in FIGS. 1A and 1B, the payment acceptor may include a coin slot 26 and a payment, note or bill acceptor 28, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is read by the processor. In one embodiment, after appropriate funding of the gaming device, the input device is a game activation device, such as a pull arm 32 or a play button 34 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 36. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 38. The player may push the cash out button and cash out to receive a cash payment or other suitable form of payment corresponding to the number of remaining credits. In one embodiment, when the player cashes out, the player receives the coins or tokens in a coin payout tray 40. In one embodiment, when the player cashes out, the player may receive other payout mechanisms such as tickets or credit slips redeemable by a cashier or funding to the player's electronically recordable identification card.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. The primary or base game may comprise any suitable reel-type game susceptible to representation in an electronic or electromechanical form which produces a random outcome based on probability data upon activation from a wager.

In one embodiment, as illustrated in FIGS. 1A and 1B, a base or primary game is a slot game with a plurality of separate paylines 52. The paylines may be horizontal, vertical, circular, diagonal, angled or any combination thereof. In this embodiment, the gaming device displays at least one and preferably a plurality of reels 54, such as three to five reels 54 in either electromechanical form with mechanical rotating reels or video form with simulated reels and movement thereof. In one embodiment, an electromechanical slot machine includes a plurality of adjacent, rotatable wheels which may be combined and operably coupled with an electronic display of any suitable type. In another embodiment, if the reels 54 are in video form, the plurality of simulated video reels 54 are displayed on one or more of the display devices as described above. Each reel 54 displays a plurality of indicia such as bells, hearts, fruits, numbers, letters, bars or other images which preferably correspond to a theme associated with the gaming device. In this embodiment, the gaming device awards prizes when the reels of the primary game stop spinning if specified types and/or configurations of indicia or symbols occur on an active pay line or otherwise occur in a winning pattern.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
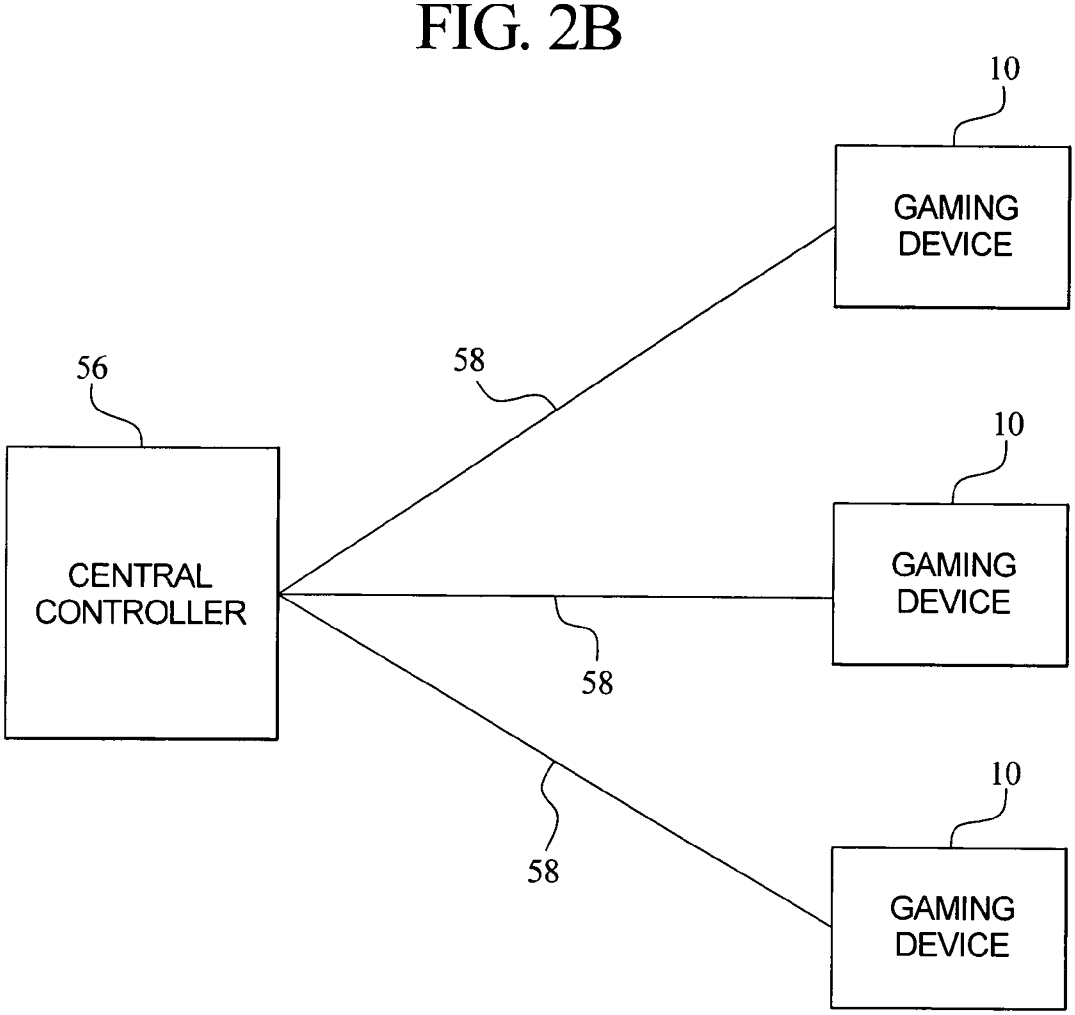
FIG. 2B is a schematic block diagram illustrating a plurality of gaming terminals and communication with a central controller.

In one embodiment, as illustrated in FIG. 2B, one or more of the gaming devices 10 of the present invention may be connected to each other through a data network or a remote communication link 58 with some or all of the functions of each gaming device provided at a central location such as a central server or central controller 56. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer. Each central server computer is responsible for all data communication between the gaming device hardware and software and the host site computer.

Escalating Payline Multipliers

One embodiment of the present invention is directed to a gaming device having a game including a plurality of escalating payline modifiers which respectively modify outcomes associated with any winning symbol combinations indicated on one or more paylines.

In one embodiment, the gaming device includes a plurality of paylines associated with a plurality of reels, wherein each of the reels includes a plurality of symbols. A plurality of fixed modifiers such as a plurality of fixed multipliers are individually associated with the paylines such that each payline has a different associated multiplier. In one embodiment, the paylines are numbered and the modifiers or multipliers are determined by the payline numbers. For example, the value of the multiplier associated with payline one is 1×, payline two is 2×, payline three is 3×, and so forth up to the maximum number of paylines in a game. In another example, the value of the multiplier associated with payline one is 1×, payline two is 1.5×, payline three is 1.8×, and so forth up to the maximum number of paylines in a game. In a still further example, the value of the modifier associated with payline one is “Plus 10 Credits”, payline two is “Plus 20 Credits”, payline three is “Plus 30 Credits”, and so forth up to the maximum number of paylines in a game. In a still further example, the value of the modifier associated with payline one is “Plus 1 Free Spin”, payline two is “Plus 2 Free Spins”, payline three is “Plus 3 Free Spins”, and so forth up to the maximum number of paylines in a game. It should thus be appreciated that the modifiers may be multipliers, additional values added to the awards, free spins or any other suitable modifiers.

In one embodiment, the gaming device includes at least one input device which is adapted to enable the player to input wager amounts on at least one of the paylines. In one embodiment, the wager amounts made by the player are sequentially placed on each of the paylines based on the payline numbers. For example, the player’s first wager is placed on payline one, the player’s second wager is placed on payline two and the player’s third wager is placed on payline three. In this embodiment, the gaming device provides an award or awards to the player only for the paylines wagered on by the player. Therefore, the player has a greater chance to receive larger awards if the player wagers on more paylines. If the winning symbol combinations occur on the wagered on paylines, the gaming device multiplies the awards associated with the winning symbol combinations on the paylines by the multipliers associated with those respective paylines. It should be appreciated that the input device is adapted to enable the player to wager on one payline, a plurality of paylines or all of the paylines in a spin or for an activation of the reels. It should also be appreciated that the player may wager the same wager amount or different wager amounts on one or more of the paylines.

As described above, the payline multipliers can significantly increase the awards associated with the winning symbol combinations occurring on the reels. Accordingly, a player's excitement and enjoyment of the game increases because the player knows that any awards that they obtain in a game can be multiplied by the fixed multipliers in the game.

Figure 3A:
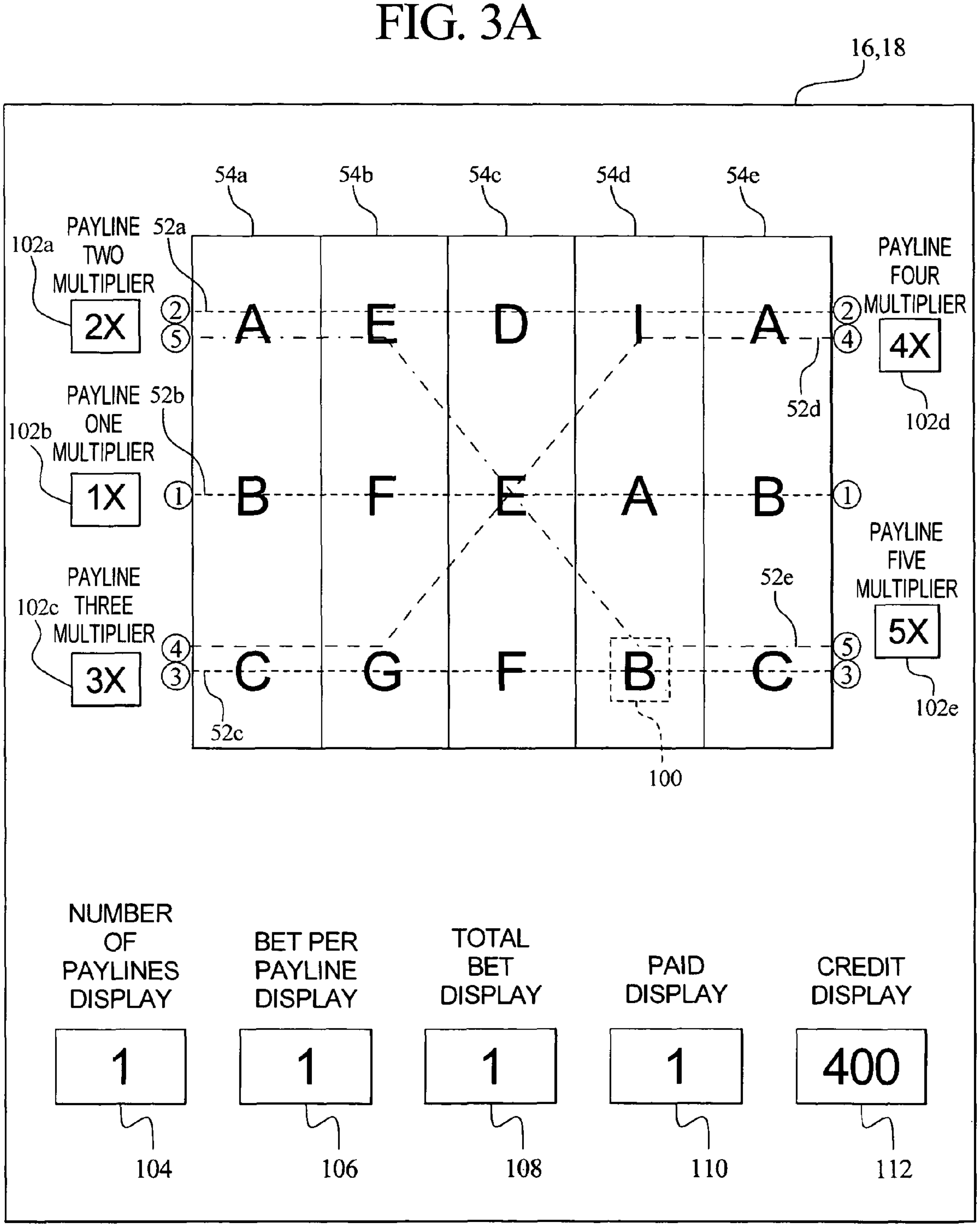
FIG. 3A is a front elevation view of one of the display devices of FIGS. 1A and 1B illustrating one embodiment of the present invention.

Referring now to FIG. 3A, one embodiment of the present invention is illustrated where one of the display devices 16, 18 displays a plurality of reels such as reels 54*a*, 54*b*, 54*c*, 54*d* and 54*e*. Each of the reels includes at least one and preferably a plurality of symbol positions. The symbol positions are the positions or areas on the reels where the symbols are located and displayed to a player. For example, symbol position (3/2) refers to the third reel (i.e., reel 54*c*) and the second position or area on that reel (i.e., the position including the E symbol). In this embodiment, the reels include a plurality of symbols 100 which are the letters A, B, C, D, E, F, G, H and I. It should be appreciated that the reels may include any suitable symbols, characters or images as desired by the game implementer. In one embodiment, each of the symbol positions on the reels includes a predetermined or designated symbol from the plurality of symbols. In another embodiment, each of the symbol positions on the reels includes a randomly determined symbol from the plurality of symbols. It should be appreciated that any of the symbols may be in any of the symbol positions on the reels.

In one embodiment a plurality of paylines such as paylines 52*a*, 52*b*, 52*c*, 52*d* and 52*e* are associated with the reels. The paylines may include horizontally positioned or extending paylines such as paylines 52*a*, 52*b* and 52*c*. In other embodiments, the paylines include vertically extending paylines, diagonally extending paylines or any combination of paylines such as paylines 52*d* and 52*e* which extend both horizontally and diagonally across the reels. It should be appreciated that any suitable number of paylines from 1 to N number of paylines may be employed in the present invention.

In one embodiment, a plurality of fixed escalating modifiers such as fixed multipliers 102*a*, 102*b*, 102*c*, 102*d* and 102*e* are respectively associated with the paylines. Specifically, multiplier 102*a* is associated with payline 52*a*, multiplier 102*b* is associated with payline 52*b*, multiplier 102*c* is associated with payline 52*c*, multiplier 102*d* is, associated with payline 52*d* and multiplier 102*e* is associated with payline 52*e*. In one embodiment, the values of the multipliers are determined by the numbers of the paylines. For example, the value of the multiplier associated with payline 52*a* (i.e., payline two) is 2×. Similarly, the values of the multipliers associated with paylines 52*b*, 52*c*, 52*d* and 52*e* are 1×(i.e., payline one), 3×(i.e., payline three), 4×(i.e., payline four) and 5×(i.e., payline five), respectively. The multipliers modify or multiply any awards associated with winning symbol combinations occurring on the respective paylines. It should be appreciated that the modifiers or multipliers may be associated with the paylines using any suitable method of assigning multipliers, including assigning escalating values in proportion to the payline number and/or assigning other values to each payline. In addition, escalating modifier or multipliers may be assigned to sub-groups of paylines. It should also be appreciated that the values of the modifiers or multipliers may be any suitable values.

As described above, the modifiers or multipliers respectively increase any awards provided to a player in a spin or activation of the reels and specifically, increases the awards based each the particular payline indicating a winning symbol combination. As a result, the player's excitement and enjoyment of the game increases because the player has an opportunity to receive a larger award and potentially a significantly larger award in the game depending on which payline or paylines indicate the winning symbol combinations in the game.

In one embodiment, the gaming device provides an outcome to the player when a designated combination of symbols such as a winning combination of symbols occurs or is indicated on any one or on a plurality of the paylines 52*a*, 52*b*, 52*c*, 52*d* and 52*e*. In one embodiment, the outcome includes one or more awards, prizes, credits, free spins, free games, game elements or any other suitable award. The award or awards are provided to a player when one or more of the winning symbol combinations occur on one or more of the paylines. It should be appreciated that the designated combination of symbols or winning symbol combinations may be a line pay, a line scatter pay, a reel scatter pay or any suitable winning combination of the symbols. In one embodiment, at least two of the winning symbol combinations associated with each of the paylines are different. In another embodiment, all of the winning symbol combinations associated with each of the paylines is different. It should be appreciated that any suitable winning symbol combinations may be associated with one or more of the paylines.

In one embodiment, the gaming device includes a set of meters or displays used to display the salient information for the game, including the number of credits, number of pay lines, amount bet per line, total bet, and the amount paid to the player in a spin of the reels. If necessary, any number of meters may be added to further facilitate control of the games.

In one embodiment, the number of credits in the credit pool is displayed by a credit meter or credit display 112. The pool of credits increases and decreases according to the player's wins or losses in a game and may be supplemented, if necessary, by the player when the player deposits additional coins, tokens or paper currency into the gaming device.

In one embodiment, the number of pay lines wagered upon by the player in a game is displayed on a Number of Pay Lines meter or display 104. The pay lines are activated in a predetermined order, as follows: the first wager is applied to pay line 52*a*; the second wager is applied to pay line 52*b*; the third wager is applied to pay line 52*c*; the fourth wager is applied to pay line 52*d*; and the fifth wager is applied to pay line 52*e*. It should be appreciated that the a game may have fewer or greater than five pay lines and the paylines may be activated in any suitable order.

In one embodiment, the number of credits wagered on each pay line is displayed on a Bet Per Line display 106. In this embodiment, the same amount is wagered on each of the pay lines. Alternatively, In another embodiment the player could wager different amounts on each pay line, a plurality of the paylines or any suitable number of the paylines.

In one embodiment, the total number of credits bet on all of the pay lines is displayed by a Total Bet display 108. The total bet is calculated by multiplying the number of pay lines by the bet per line. In addition, the number of credits awarded for any winning symbol combinations occurring on the paylines is displayed by a Paid display 110. In one embodiment, if the player did not place a wager on a particular payline or paylines, the gaming device does not provide an award or awards for any winning symbol combinations occurring on those paylines. In another embodiment, the gaming device provides a consolation award or awards for any winning symbol combinations occurring on paylines which were not wagered upon by the player.

In one embodiment, all winning symbol combinations are defined by pay tables or award summary tables associated with a game. The pay tables define the winning symbol combinations for a game such as a winning symbol combination including three or more of the same symbols on a pay line. Each symbol in a symbol position counts towards the total number of symbols on a pay line. In addition, a pay table may also define scatter awards for winning symbol combinations including symbols scattered anywhere on the reels. Alternatively, any pre-determined or designated arrangement of symbols may be defined as a winning symbol combination in a game and any suitable number of outcomes, awards or credits may be provided to a player for the winning symbol combinations.

EXAMPLE

Referring now to FIGS. 3A to 3E, an example of the one embodiment of the present invention is illustrated where the gaming device includes a game having a plurality of reels such as reels 54*a*, 54*b*, 54*c*, 54*d* and 54*e*. Each reel includes a plurality of symbol positions which are the positions on the reels where symbols are located and displayed to a player. Additionally, the reels include a plurality of symbols such as letters A, B, C, D, E, F, G, H and I. The gaming device also includes a plurality of paylines 52*a*, 52*b*, 52*c*, 52*d* and 52*e* associated with the reels. In this example, there are three horizontal paylines 52*a*, 52*b* and 52*c*, and two other paylines 52*d* and 52*e* associated with the reels. It should be appreciated that that any suitable number of paylines may be associated with the reels.

In this embodiment, the player must obtain a designated combination of the symbols 100 on at least one of the paylines 52*a*, 52*b* or 52*c*. Furthermore, in this example, the winning symbol combinations must form a line pay or a combination of at least three of the same symbols beginning on reel 54*a*. For example, if three identical or matching symbols are indicated in adjacent symbol positions on payline 52*a* associated with reels 54*a*, 54*b* and 54*c*, the gaming device provides an award to the player. Additionally in this example, the gaming device displays several different meters or displays as described above.

It should be appreciated that the designated symbol combinations or winning symbol combinations in the game may include any suitable combination of the same symbols or different symbols in the game. In addition, it should be appreciated that the winning symbol combinations may provide any suitable awards, prizes, free games, free spins, game elements or any other suitable award, awards or outcomes in the game.

Referring to FIG. 3A, the player initially inserts currency into the game and obtains four hundred credits as indicated by the credit display 114. The player is now ready to begin playing the game.

Referring to FIGS. 3B to 3E, the gaming device sets or fixes the different values of the modifiers or multipliers 102*a*, 102*b*, 102*c*, 102*d* and 102*e* in the game. The multipliers are determined based on the particular payline 52 which the multiplier is associated with in the game. For example, the multiplier 102*b* associated with payline one (52*b*) has a value of 1×, the multiplier 102*a* associated with payline two (52*a*) has a value of 2× and so forth. Thus, the values of the different multipliers are fixed and are based on the payline numbers of the paylines associated with the multipliers in the game. Accordingly, multipliers 102*c*, 102*d* and 102*e* have values of 3×, 4× and 5×, respectively, because these multipliers are associated with payline three or 52*c*, payline four or 102*d* and payline five or 102*e*, respectively.

Figure 3B:
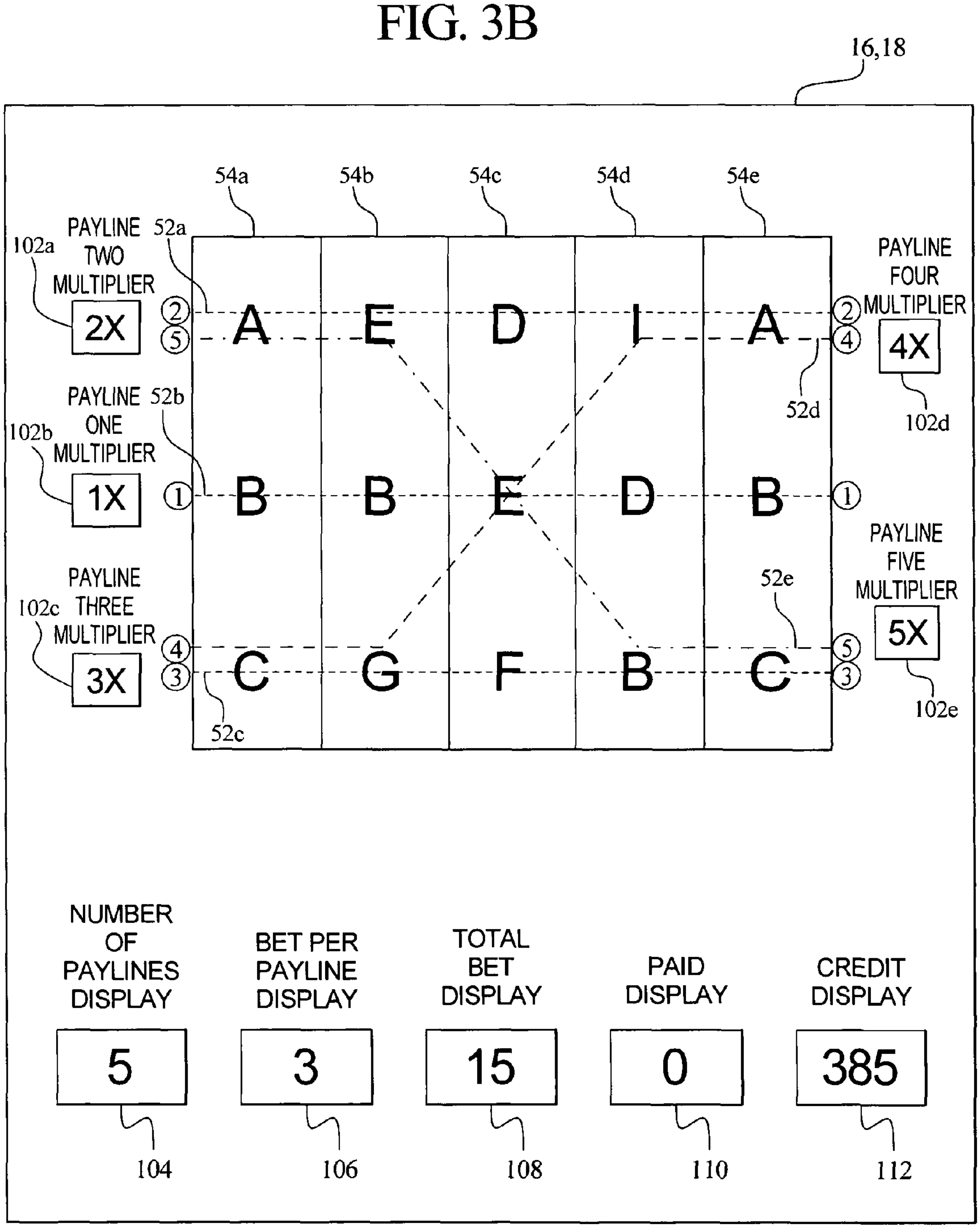
FIGS. 3B, 3C, 3D and 3E are front elevation views of one of the display devices of FIGS. 1A and 1B illustrating an example play of the embodiment of FIG. 3A.

Referring to FIG. 3B, the player begins playing the game by pressing the select paylines button four times to increase the number of paylines wagered in the game from one to five as indicated by the number of paylines display 104. In this example, there are five paylines 52*a*, 52*b*, 52*c*, 52*d* and 52*e* associated with the reels 54. Therefore, the player has wagered on the maximum number of paylines in the game. The player then presses the bet per payline button to increase their bet or wager on each payline from one to three credits as indicated by the bet per payline display 106. Therefore, the player is wagering three credits on each of the paylines 52*a*, 52*b*, 52*c*, 52*d* and 52*e*. Based on the wager made by the player in the spin or activation of the reels in the game, the player has wagered a total bet or wager of fifteen as indicated by the total bet display 108. The total bet equals the number of paylines wagered on by the player, which is five, multiplied by the amount bet per payline by the player, which is three. Because the game has not started yet the Paid display 110 indicates a zero or that the player has not received any awards or credits in the game. The total bet of fifteen made by the player in this activation or spin of the reels is subtracted from the players total credits in the game of four hundred which results in the new total number of credits being three hundred eighty-five as indicated by the credit display 112.

Figure 3C:
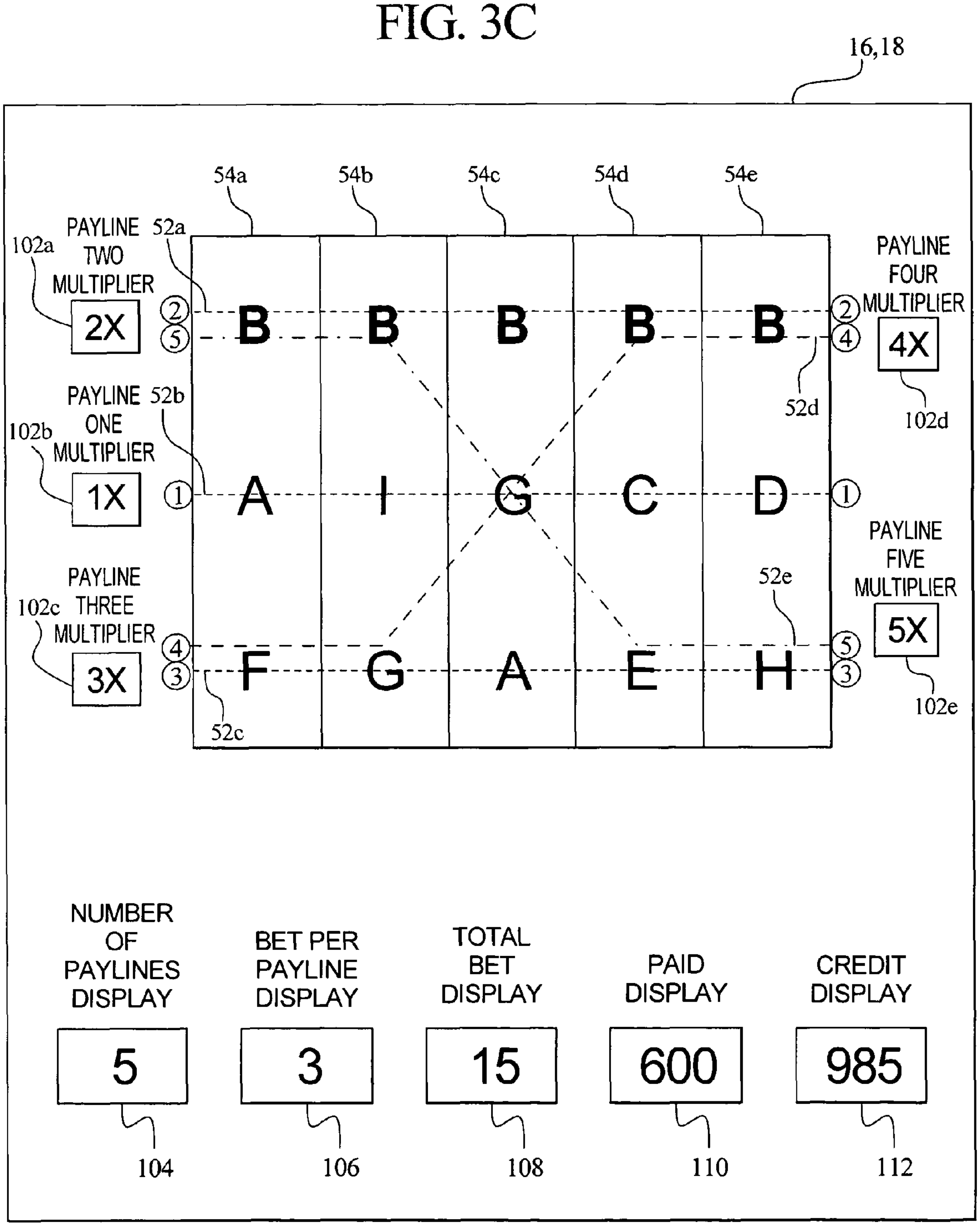

Referring now to FIG. 3C, the player presses or activates the play button 34 or pull arm 32 (shown in FIGS. 1A and 1B) to activate or spin the reels in a game. The reels stop and display a plurality of symbols in the symbol positions on the reels 54. Specifically, a winning symbol combination occurred on payline two or payline 52*a* associated with reels. The winning symbol combination includes five "B" symbols. Specifically, the winning symbol combination includes "B" symbols at symbol positions 1/1, 2/1, 3/1, 4/1 and 5/1. According to the paytable (not shown), a winning symbol combination including five "B" symbols pays one hundred credits for each credit wagered upon payline 52*a*. Therefore, the spin award or paid award for this spin is an award of six hundred credits (i.e., the award of one hundred multiplied by the payline multiplier of 2× associated with payline 52A multiplied by the three credits wagered on the payline). The award of six hundred is added to the player's total credits and gives the player a new total number of credits of nine hundred eighty-five as indicated by the credit display 112.

Figure 3D:
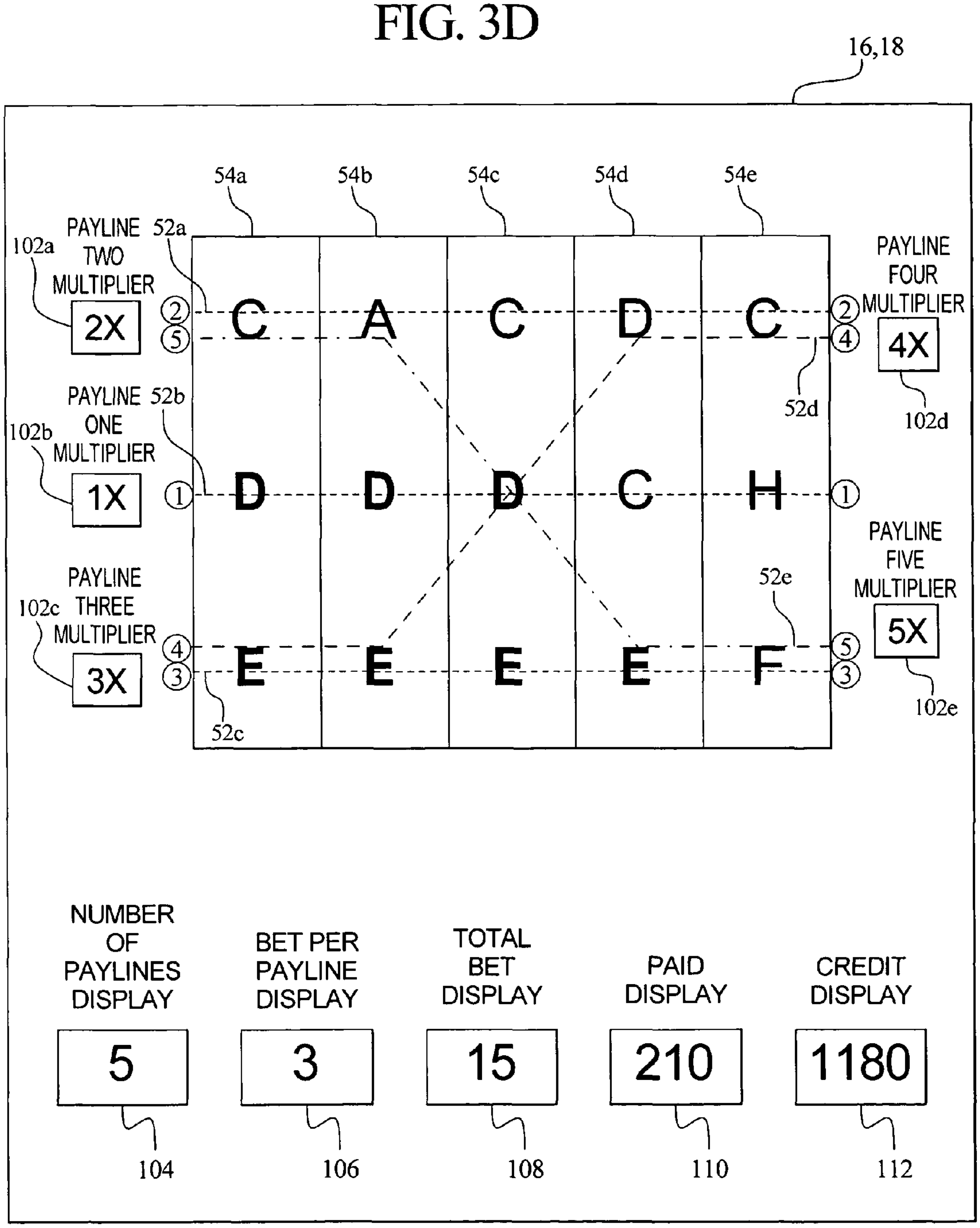

Referring now to FIG. 3D, the gaming device or player activates or spins the reels for a second time. Again, the player wagers on the maximum number of paylines, five, as indicated by the number of paylines displayed 104. The player also wagers or bets three credits on each of the paylines as indicated by the bet per payline display 106. Therefore, the player's total bet is fifteen, as indicated by the total bet display 108. The total bet of fifteen is subtracted from the credit display shown in FIG. 3C to give the player a total number of credits before the second spin of nine-hundred seventy. The player activates or spins the reels and when the reels stop, a plurality of symbols are indicated in the symbol positions on the reels. Specifically, a winning symbol combination including three "D" symbols is indicated on payline 52*d* at symbol positions 1/2, 2/2 and 3/2. Additionally, another winning symbol combination occurred on payline three or payline 52C. The winning symbol combination on payline three includes four "E" symbols located at symbol positions 1/3, 2/3, 3/3 and 4/3. According to the paytable, a winning symbol combination including three "D" symbols pays ten credits for each credit wagered upon the payline. Therefore, the gaming device awards or provides the player with thirty credits (i.e., the award of ten credits multiplied by the payline multiplier of 1× associated with payline one multiplied by the three credits wagered on payline one). The gaming device also provides an award to the player for the winning symbol combination indicated by payline three or payline 52*c*. According to the paytable, a winning symbol combination including four "E" symbols pays twenty credits for each credit wagered upon the payline. Therefore, the gaming device awards the player with one-hundred eighty additional credits (i.e., the award of twenty credits multiplied by the payline multiplier of 3× associated with payline three and multiplied by the two credits wagered on payline three). Thus, the total number of credits provided to the player in this spin or activation of the reels is two hundred ten credits. Therefore, the gaming device awards two hundred ten credits to the player for the spin. The credit meter 112 moves from nine-hundred seventy to one thousand one-hundred eighty to reflect the award obtained by the player in this spin.

In this example, the gaming device provides awards for each winning symbol combination indicated on the reels. In another embodiment, the gaming device only provides the largest award associated with any of the winning symbol combinations indicated on the reels. It should be appreciated that the gaming device may provide one, a plurality or all of the awards associated with winning symbol combinations indicated on the reels.

Figure 3E:
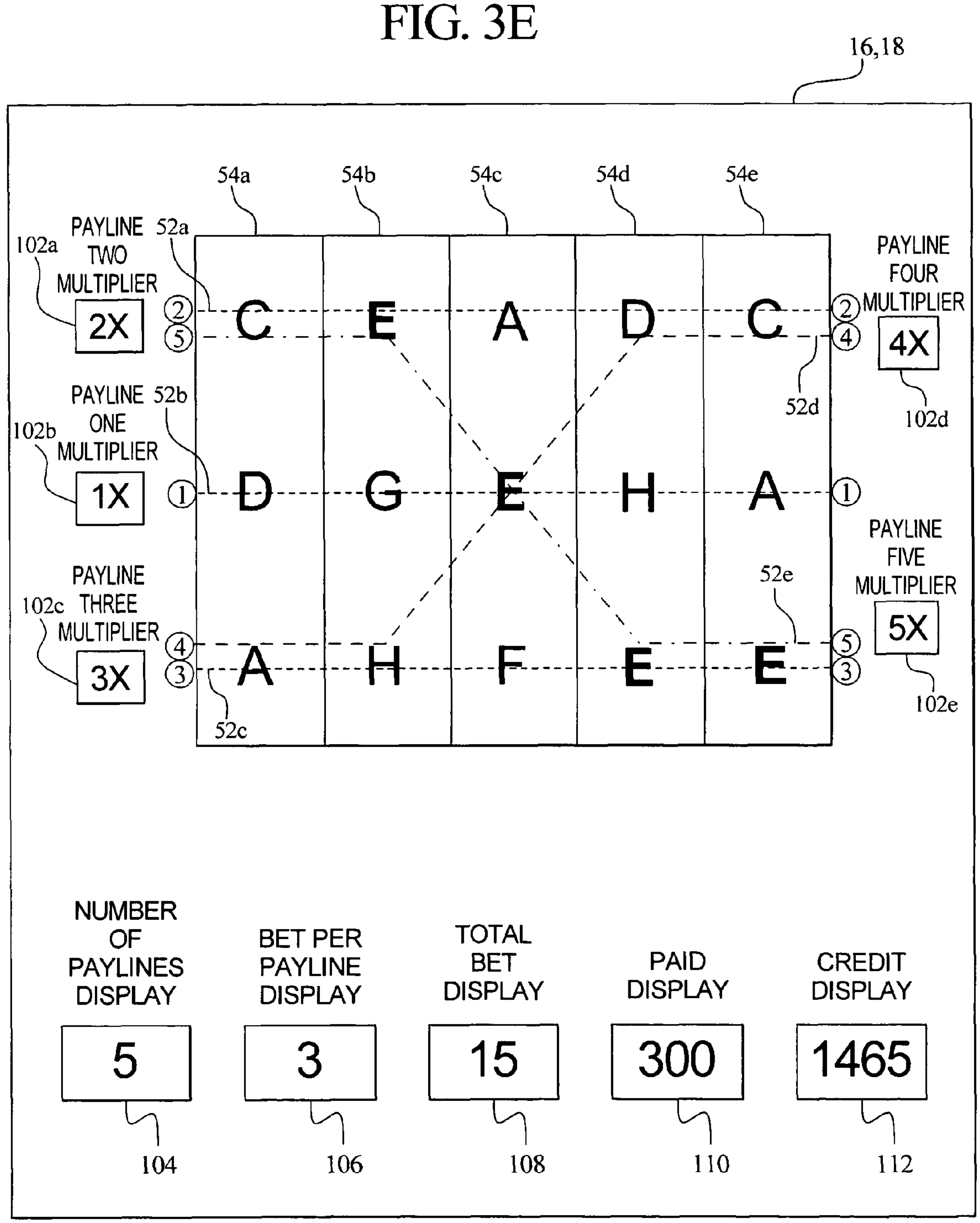

Referring now to FIG. 3E, the player spins the reels for a third time. The player selects the maximum number of paylines, five, for this spin as indicated by the number of paylines displayed 104. The player also bets three credits for each of the paylines that they selected as indicated by the bet per payline display 106. Thus, the total bet made by the player for this spin is fifteen as indicated by the total bets display 110. The total bet of fifteen is subtracted from the player's total credits. The player's new total number of credits prior to the spin becomes one thousand one hundred sixty-five.

The gaming device or player spins the reels for the third time in the game. The reels stop spinning and indicate a plurality of symbols at the symbol positions on the reels. Specifically, a winning symbol combination including four "E" symbols occurs or is indicated on payline 52*e*. The four "E" symbols occurred at symbol positions 2/1, 3/1, 4/2 and 5/3. The multiplier associated with payline five or payline 52*e* is 5×. As indicated above, a winning symbol combination including four "E" symbols provides an award of twenty credits for each credit wagered upon the payline. Therefore, the gaming device provides an award of three-hundred credits (i.e., the award of twenty credits multiplied by the payline multiplier of 5× associated with payline five multiplied by the three credits wagered on payline five). The total award of three-hundred credits is added to the player's total credits in the game to give the player a new total number of credits of one thousand four hundred sixty-five as indicated by credit display 112. The player decides not to continue playing the gaming device and therefore presses the cash out button to receive the total number of credits of one thousand four-hundred sixty-five as indicated by the credit display 112. It should be appreciated that the gaming device may issue the credits in the form of currency (i.e., cash or coins), a ticket, an electronic payment, a voucher or any other suitable form of payment.

In the primary embodiment, the multiplier values remain fixed in all of the spins. In one embodiment, the present invention is employed in a four row by five column symbol matrix with twenty paylines. In another embodiment, the present invention is employed in a three row by five column symbol matrix with fifteen paylines.

It should also be appreciated that the present invention may be employed in a primary game, a secondary or bonus game or any other suitable type of game.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention is claimed as follows:

1. A gaming device comprising:

a plurality of reels controlled by at least one processor, each of said reels including a plurality of symbols;

a plurality of different paylines associated with the reels, the plurality of different paylines including a first payline;

a plurality of different winning symbol combinations adapted to occur on said paylines; and a plurality of different predetermined modifiers including a first predetermined modifier, each of said different predetermined modifiers being used with a different one of said paylines and having a value determined independent of each of the plurality of different winning symbol combinations, wherein the first predetermined modifier is the same for each play of a game and is being used with the first payline for each play of the game;

wherein the at least one processor is programmed for each play of the game to:

(a) activate said reels, (b) enable a player to wager on a quantity of the paylines, (c) determine whether any of the plurality of different winning symbol combinations occur on any of the wagered-on paylines, and (d) provide at least one outcome to the player when at least one of the winning symbol combinations occurs on any of the wagered-on paylines, wherein, for each of any winning symbol combinations which occurs on one of the wager-on paylines, the at least one outcome is based on an award associated with said winning symbol combination and is also based on the predetermined modifier being used with the wagered-on payline on which said winning symbol combination occurs.

2. The gaming device of claim 1, wherein the paylines include at least one of: a horizontally extending payline, a vertically extending payline, a diagonally extending payline and any combination of these paylines.

3. The gaming device of claim 1, wherein each of the paylines is numbered successively.

4. The gaming device of claim 3, wherein the values of the different predetermined modifiers increase by a predetermined amount for each of the successively numbered paylines.

5. The gaming device of claim 3, wherein the values of the different predetermined modifiers increase sequentially for each of the successively numbered paylines.

6. The gaming device of claim 3, wherein the values of the different predetermined modifiers increase by a predetermined factor for each of the successively numbered paylines.

7. The gaming device of claim 3, wherein the number of each of the paylines is predetermined.

8. The gaming device of claim 1, which includes at least one input device controlled by the at least one processor, wherein the at least one input device is operable to enable the player to input wager amounts for each of the paylines to wager on the quantity of the paylines in a successive order of the paylines.

9. The gaming device of claim 8, wherein the outcome includes any awards associated with the winning symbol combinations occurring on the wagered-on paylines modified by the predetermined modifiers respectively being used with said wagered-on paylines and multiplied by the wager amount inputted by the player for said respective wagered-on paylines.

10. The gaming device of claim 1, which includes at least one input device controlled by the at least one processor, wherein the at least one input device is operable to enable the player to input a same wager amount for each of the plurality of wagered-on paylines.

11. The gaming device of claim 1, which includes at least one input device controlled by the processor, wherein the at least one input device is operable to enable the player to input a same wager amount for all of the paylines.

12. The gaming device of claim 1, wherein the outcome includes, for each wagered-on payline on which one of the winning symbol combinations occurs, the award associated with said winning symbol combination modified by the predetermined modifier being used with said wagered-on payline.

13. The gaming device of claim 1, wherein the value of each of said different predetermined modifiers is the same for each play of the game and wherein each of the different predetermined modifiers is respectively being used with a same one of the paylines for each play of the game.

14. A gaming device comprising:

a plurality of reels controlled by at least one processor, each of said reels including a plurality of symbols;

a plurality of different paylines associated with the reels, the paylines including a first payline;

a plurality of different winning symbol combinations, each winning symbol combination being adapted to occur on any of the paylines; and a plurality of different predetermined multipliers including a first multiplier, each of said different predetermined multipliers having a value determined independent of each of the plurality of different winning symbol combinations and being used with a different one of said paylines, wherein the first predetermined multiplier is the same for each play of a game and is being used with the first payline for each play of the game;

wherein the at least one processor is programmed for each play of the game to:

(a) activate said reels, (b) enable a player to wager on a quantity of the paylines, (c) determine whether any of the plurality of different winning symbol combinations occur on any of the wagered-on paylines, and (d) provide at least one outcome to the player when at least one of the winning symbol combinations occurs on any of the wagered-on paylines, wherein, for each of any winning symbol combinations which occurs one of the wagered on paylines, the at least one outcome is based on an award associated with said winning symbol combination, said award being multiplied by the predetermined multiplier being used with the wagered-on payline on which said winning symbol combination occurs.

15. The gaming device of claim 14, wherein the paylines include at least one of: a horizontally extending payline, a vertically extending payline, a diagonally extending payline and any combination of these paylines.

16. The gaming device of claim 14, wherein each of the paylines is numbered successively and the value of each of the plurality of different predetermined multipliers is based on the number of the paylines.

17. The gaming device of claim 16, wherein the values of the different predetermined multipliers increase by a predetermined amount for each of the successively numbered paylines.

18. The gaming device of claim 16, wherein the values of the different predetermined multipliers increase sequentially for each of the successively numbered paylines.

19. The gaming device of claim 16, wherein the values of the different predetermined multipliers increase by a predetermined factor for each of the successively numbered paylines.

20. The gaming device of claim 16, wherein the number of each of the paylines is predetermined.

21. The gaming device of claim 14, which includes at least one input device controlled by the at least one processor, wherein the at least one input device is operable to enable the player to input wager amounts for each of the paylines to wager on the quantity of the paylines in a successive order of the paylines.

22. The gaming device of claim 21, wherein the outcome includes any awards associated with the winning symbol combinations occurring on the wagered-on paylines multiplied by the predetermined multipliers respectively being used with said wagered-on paylines and multiplied by the wager amount inputted by the player for said wagered-on paylines.

23. The gaming device of claim 14, which includes at least one input device controlled by the at least one processor, wherein the at least one input device is operable to enable the player to input a same wager amount for each of the plurality of wagered-on paylines.

24. The gaming device of claim 14, which includes at least one input device controlled by the at least one processor, wherein the at least one input device is operable to enable the player to input a same wager amount for all of the paylines.

25. The gaming device of claim 14, wherein the outcome includes, for each wagered-on payline on which one of the winning symbol combinations occurs, the award associated with said winning symbol combination modified by the multiplier being used with said wagered-on payline.

26. The gaming device of claim 14, wherein the value of each of the different predetermined multipliers is the same for each play of the game and wherein each of the different predetermined multipliers is respectively being used with a same one of the paylines for each play of the game.

27. A method for operating a gaming device, said method comprising:

causing a processor to operate with a display device to:

(a) provide a game including a plurality of different winning symbol combinations; and (b) display a plurality of reels and a plurality of different paylines including a first payline to a player, each of said reels including a plurality of symbols, wherein said paylines are associated with said reels, and wherein a different predetermined modifier is being used with each of said different paylines, each of the predetermined modifiers having a value determined independent of each of the plurality of different winning symbol combinations, the predetermined modifiers including a first predetermined modifier, wherein the first predetermined modifier is the same for each play of the game and is being used with the first payline for each play of the game; and causing the processor to operate with the display device and an input device, for each play of the game, to:

(i) activate the reels, (ii) enable the player to wager on a quantity of the paylines, (iii) determine whether any of the plurality of different winning symbol combinations occur on any of the wagered-on paylines, and (iv) provide an outcome to the player when at least one of the winning symbol combinations occurs on any of the wagered-on paylines, wherein, for each of any winning symbol combinations which occurs on one of the wagered-on paylines, the outcome is based on an award associated with said winning symbol combination and is also based on the predetermined modifier being used with said wagered-on payline on which said winning symbol combination occurs.

28. The method of claim 27, which includes successively numbering the paylines.

29. The method of claim 28, which includes increasing the values of the modifiers for each of the successively numbered paylines.

30. The method of claim 28, which includes sequentially increasing the values of the predetermined modifiers for each of the successively numbered paylines.

31. The method of claim 28, which includes enabling the player to sequentially input a wager amount for each of the successively numbered paylines to wager on the quantity of the paylines.

32. The method of claim 27, which includes enabling the player to input a wager amount for each of the paylines in a successive order to wager on the quantity of the paylines.

33. The method of claim 27, which includes enabling the player to input a wager amount for each of the quantity of wagered-on paylines.

34. The method of claim 27, which includes enabling the player to input a wager amount for all of the paylines.

35. The method of claim 25, wherein the outcome includes any awards associated with the winning symbol combinations occurring on the wagered-on paylines modified by the modifiers respectively being used with said wagered-on paylines and multiplied by the wager amount inputted by the player for said respective wagered-on paylines.

36. The method of claim 27, wherein the outcome includes, for each wagered-on payline on which one of the winning symbol combinations occurs, the award associated with said winning symbol combination modified by the predetermined modifier being used with said wagered-on payline.

37. The method of claim 27, which includes operating the gaming device through a data network.

38. The method of claim 37, wherein the data network is an internet.

39. The method of claim 27, wherein computer instructions for implementing steps (a) to (b) are stored in a memory device.

40. The method of claim 27, wherein the value of each of the predetermined modifiers is the same for each play of the game and wherein each of the predetermined modifiers is respectively being used with a same one of the paylines for each play of the game.

41. A method for operating a gaming device, said method comprising the steps of:

causing a processor to operate with a display device to:

(a) provide a game;

(b) provide a plurality of different winning symbol combinations adapted to occur on any of a plurality of different paylines; and (c) display a plurality of reels and the plurality of different paylines to a player including a first payline, each of said reels including a plurality of symbols, wherein said paylines are associated with said reels, and wherein a different predetermined multiplier is being used with each of said different paylines, the different predetermined multipliers each having a value determined independent of each of the plurality of different winning symbol combinations and including a first multiplier, and wherein the first predetermined multiplier is the same for each play of the game and is being used with the first payline for each play of the game; and causing the processor to operate with the display device and an input device, for each play of the game, to:

(i) activate the reels, (ii) enable the player to wager on a quantity of the paylines, (iii) determine whether any of said plurality of different winning symbol combinations occur on any of the wagered-on paylines, and (iv) provide an outcome to the player when at least one of the winning symbol combinations occurs on any of the wagered-on paylines, wherein, for each of any winning symbol combinations which occurs, the outcome is based on an award associated with said winning symbol combination, said award being multiplied by the predetermined multiplier being used with said wagered-on payline on which said winning symbol combination occurs, the predetermined multiplier being independent of said winning symbol combination.

42. The method of claim 41, including successively numbering the paylines and setting a value for each of the plurality of different predetermined multipliers based on the successively numbered paylines.

43. The method of claim 42, which includes increasing the values of the predetermined multipliers for each of the successively numbered paylines.

44. The method of claim 42, which includes sequentially increasing the values of the predetermined multipliers for each of the successively numbered paylines.

45. The method of claim 42, which includes enabling the player to sequentially input a wager amount for each of the successively numbered paylines to wager on the quantity of the paylines.

46. The method of claim 41, which includes enabling the player to input a wager amount for each of the paylines in a successive order to wager on the quantity of the paylines.

47. The method of claim 41, which includes enabling the player to input a wager amount for each of a plurality of the paylines to wager on the quantity of the paylines.

48. The method of claim 41, which includes enabling the player to input a wager amount for all of the paylines.

49. The method of claim 41, wherein the outcome includes any awards associated with the winning symbol combinations occurring on the wagered-on paylines modified by the predetermined multipliers respectively being used with said wagered-on paylines and multiplied by the wager amount inputted by the player for said respective wagered-on paylines.

50. The method of claim 41, wherein the outcome includes, for each wagered-on payline on which one of the winning symbol combinations occurs, the award associated with said winning symbol combination multiplied by the predetermined multiplier being used with said wagered-on payline.

51. The method of claim 41, which includes operating the gaming device through a data network.

52. The method of claim 51, wherein the data network is an internet.

53. The method of claim 41, wherein computer instructions for implementing steps (a) to (c) are stored in a memory device.

54. The method of claim 41, wherein the value of each of the different predetermined multipliers is the same for each play of the game and wherein each of the predetermined modifiers is respectively being used with a same one of the paylines for each play of the game.

55. A gaming device comprising:

a plurality of reels controlled by at least one processor, each of said reels including a plurality of symbols;

a plurality of different paylines associated with the reels, wherein each of the paylines is numbered successively;

a plurality of different winning symbol combinations adapted to occur on said paylines;

a plurality of different predetermined modifiers, each of said different predetermined modifiers being used with a different one of said paylines, wherein the value of each of the plurality of different predetermined modifiers is based on the number of said payline which the modifier is being used with and is determined independent of each of the plurality of different winning symbol combinations; and at least one total award providable to a player when any winning symbol combination occurs on any of a plurality of wagered-on paylines, wherein, for each of any winning symbol combinations, the total award is based on an award associated with said winning symbol combination, and is also based on the predetermined modifier being used with the wagered-on payline on which said winning symbol combination occurs.

56. The gaming device of claim 55, wherein the value of each of the plurality of different predetermined modifiers is the same for each of a plurality of plays of the game and wherein each of the predetermined modifiers is respectively being used with a same one of the paylines for each play of the game.

57. A method for operating a gaming device, said method comprising:

causing a processor to operate with a display device and an input device to:

(a) display a plurality of reels and a plurality of different paylines to a player, wherein each of the paylines is numbered successively, each of said reels including a plurality of symbols, wherein said paylines are associated with said reels, and wherein a different predetermined modifier is being used with each of said paylines, the value of each of the plurality of different predetermined modifiers being based on the number of said payline and being determined independently from each of a plurality of different winning symbol combinations;

(b) activate the reels;

(c) enable the player to wager on a quantity of the paylines; and (d) determine whether any one of the plurality of different winning symbol combinations occurs on any of the wagered-on paylines; and causing the processor to operate with the display device to: provide a total award to the player when at least one of the winning symbol combinations occurs on any of the wagered-on paylines, wherein the total award is based on an award associated with each of any winning symbol combinations and the total award is also based on the predetermined modifier being used with the wagered-on payline on which each of any winning symbol combinations occurs.

58. The method of claim 57, which includes operating the gaming device through a data network.

59. The method of claim 58, wherein the data network is an internet.

60. The method of claim 57, wherein the value of the value of each of the plurality of different predetermined modifiers is the same for each activation of the plurality of reels and wherein each of the predetermined modifiers is respectively being used with a same one of the paylines for each activation of the reels.

61. A gaming device comprising:

a plurality of reels controlled by at least one processor, each of said reels including a plurality of symbols;

a plurality of different paylines associated with the reels, the plurality of different paylines including a first payline, each of the paylines being associated with a different number;

a plurality of different winning symbol combinations adapted to occur on said paylines; and a plurality of different predetermined modifiers including a first predetermined modifier, each of said different predetermined modifiers being used with a different one of said paylines, wherein the value of each of the plurality of different predetermined modifiers is based on the number of said payline and is determined independent of each of the plurality of different winning symbol combinations, and wherein the first predetermined modifier is the same for each play of a game and is being used with the first payline for each play of the game;

wherein the at least one processor is programmed for each play of the game to:

(a) activate said reels, (b) enable a player to wager on a quantity of the paylines, (c) determine whether any of the plurality of different winning symbol combinations occur on any of the paylines, and (d) provide at least one outcome to the player when at least one of the winning symbol combinations occurs on any of the wagered-on paylines, wherein, for each of any winning symbol combinations which occurs on one of the wagered-on paylines, the at least one outcome is based on an award associated with said winning symbol combination and is also based on the predetermined modifier being used with the wagered-on payline on which said winning symbol combination occurs.

62. The gaming device of claim 61, wherein the value of each of the plurality of different predetermined modifiers is the same for each play of the game and wherein each of the predetermined modifiers is respectively being used with a same one of the paylines for each play of the game.

63. A method for operating a gaming device, said method comprising:

causing a processor to operate with a display device to:

(a) provide a game; and (b) display a plurality of reels and a plurality of different paylines including a first payline to a player, each of said reels including a plurality of symbols, wherein said paylines are associated with said reels, wherein each payline is associated with a different number, and wherein a different predetermined modifier is being used with each of said paylines, said predetermined modifier having a value based on the number of said payline the modifier is being used with and determined independent of each of a plurality of different winning symbol combinations, the predetermined modifiers including a first predetermined modifier, the first predetermined modifier being the same for each play of the game and being used with the first payline for each play of the game; and causing the processor to operate with the display device and an input device, for each play of the game, to:

(i) activate the reels, (ii) enable the player to wager on a quantity of the paylines, (iii) determine whether any of the plurality of different winning symbol combinations occur on any of the wagered-on paylines, and (iv) provide an outcome to the player when at least one of the winning symbol combinations occurs on any of the wagered-on paylines, wherein, for each of any winning symbol combinations which occurs, the outcome is based on an award associated with said winning symbol combination and is also based on the predetermined modifier being used with said wagered-on payline on which said winning symbol combination occurs.

64. The method of claim 63, which includes operating the gaming device through a data network.

65. The method of claim 64, wherein the data network is an internet.

66. The method of claim 63, wherein the value of the different predetermined modifier being used with each of the paylines is the same for each play of the game and wherein each predetermined modifier is respectively being used with a same one of the paylines for each play of the game.

* * * * *

UNITED STATES PATENT AND TRADEMARK OFFICE

CERTIFICATE OF CORRECTION

PATENT NO. : 7,819,740 B2
APPLICATION NO. : 10/773378
DATED : October 26, 2010
INVENTOR(S) : Masci et al.

It is certified that error appears in the above-identified patent and that said Letters Patent is hereby corrected as shown below:

IN THE CLAIMS:

In Claim 1, Column 16, Line 52, replace “wager-on” with -- wagered-on --.

In Claim 14, Column 18, Lines 1 to 2, replace “which occurs one” with -- which occurs on one --.

Signed and Sealed this
Eighteenth Day of January, 2011

David J. Kappos

David J. Kappos
*Director of the United States Patent and Trademark Office*